United States Patent [19]

Windeler

[11] Patent Number: 5,028,907
[45] Date of Patent: Jul. 2, 1991

[54] IMPROPER TOWING ALARM DEVICE

[76] Inventor: Kenneth H. Windeler, 18 Tule Court, Lodi, Calif. 95242

[21] Appl. No.: 510,195

[22] Filed: Apr. 16, 1990

[51] Int. Cl.[5] .............................................. B60Q 1/900
[52] U.S. Cl. ..................................... 340/438; 340/431
[58] Field of Search ............... 340/438, 431, 457, 459, 340/451, 687

[56] References Cited

U.S. PATENT DOCUMENTS

| | | | |
|---|---|---|---|
| 3,710,370 | 1/1973 | Quilici et al. | 340/687 X |
| 4,127,855 | 11/1978 | Toner | 340/431 X |
| 4,430,637 | 2/1984 | Koch-Dücker et al. | 340/431 |
| 4,593,264 | 6/1986 | Engle | 340/431 |
| 4,642,604 | 2/1987 | Glesmann et al. | 340/451 |

*Primary Examiner*—Donnie L. Crosland
*Assistant Examiner*—Brian R. Tumm
*Attorney, Agent, or Firm*—Leon Gilden

[57] ABSTRACT

An alarm system for indicating improper towing of a vehicle having a standard transmission may embody up to two control switches in series electrical communication which are operable to activate a warning light and/or buzzer mounted within the interior of the towing vehicle. When towing a four wheel vehicle, it is desirable to make sure that the steering is not locked and also that the vehicle is not in gear. The first control switch comprises a normally open toggle switch which closes to activate the alarm circuit when the ignition switch is in the locked or not-turned-on position. The second independently operable control switch is fluid pressure activated and is opened in response to the detection of oil pressure resulting from the towed vehicle being in gear.

2 Claims, 3 Drawing Sheets

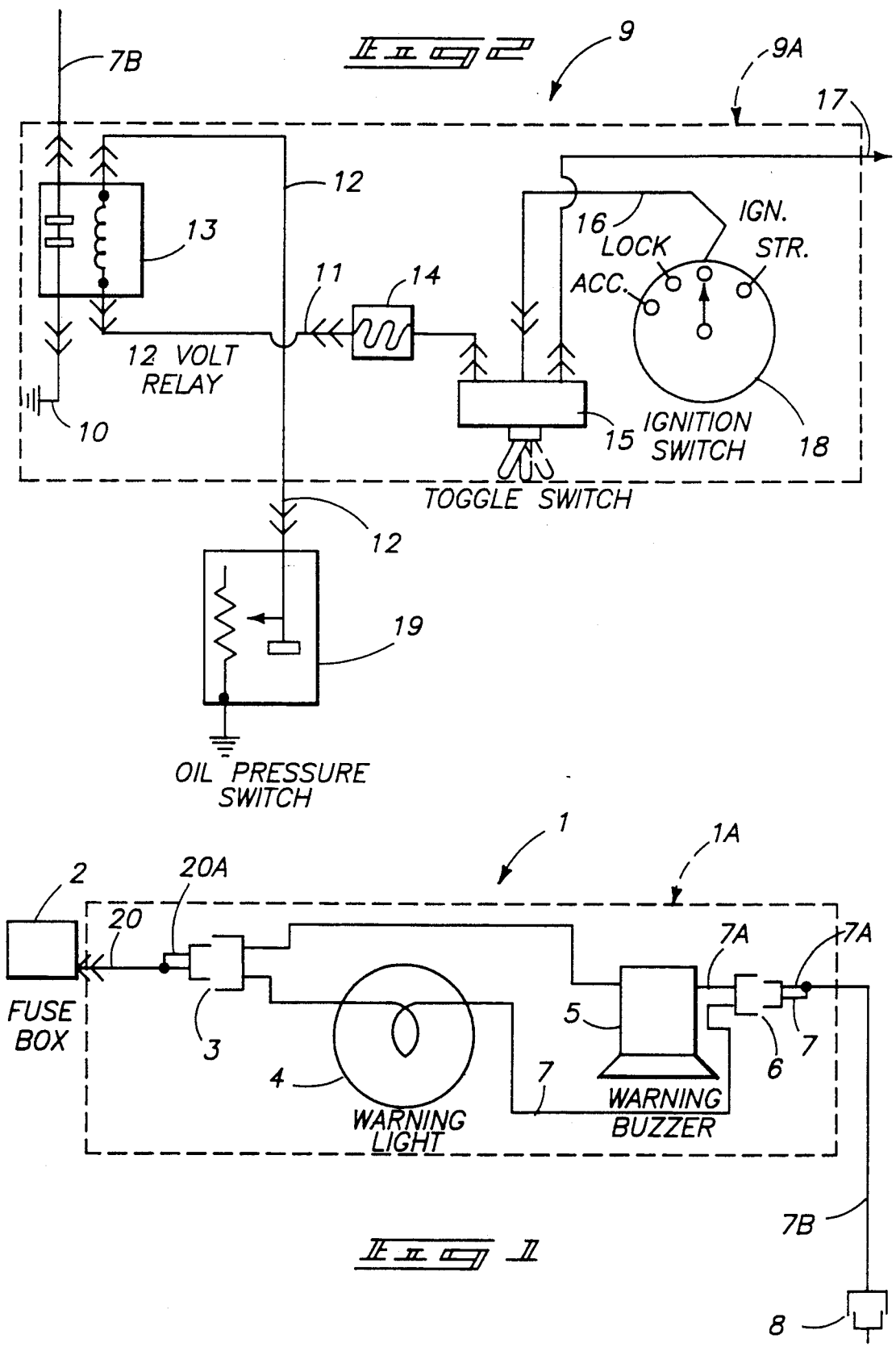

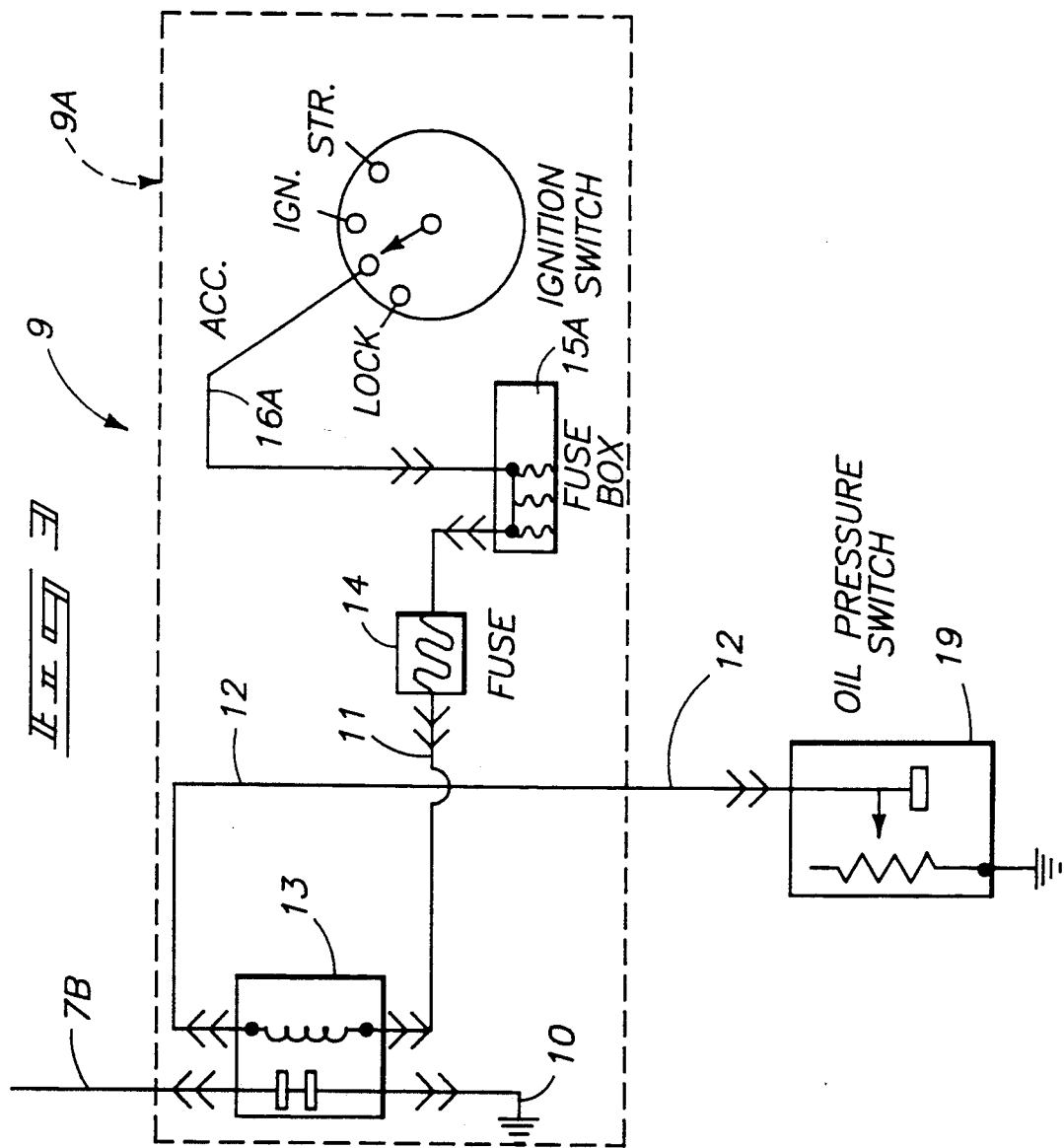

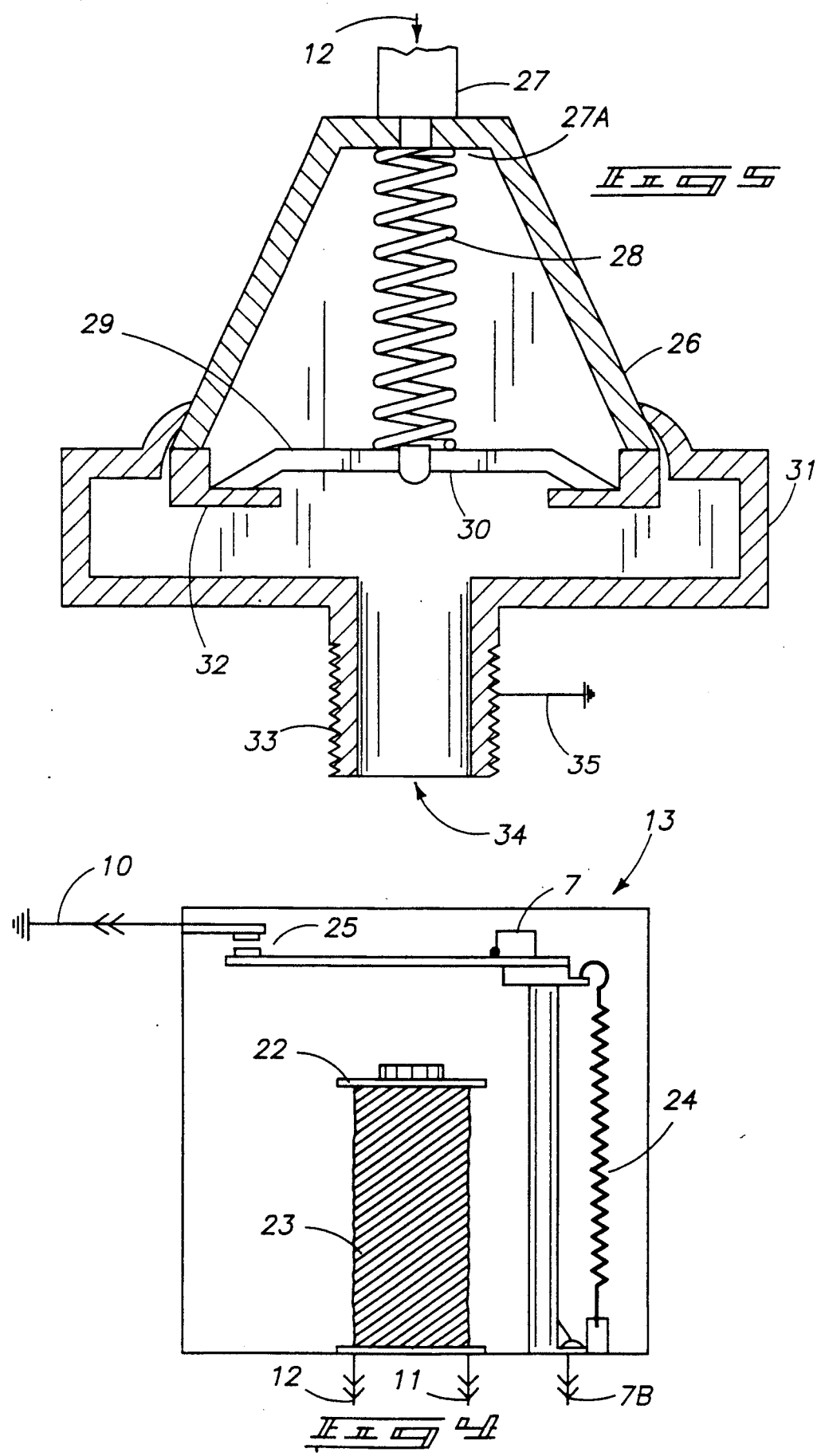

IMPROPER TOWING ALARM DEVICE

BACKGROUND OF THE INVENTION

1. Field of the Invention

The present invention relates generally to an alarm system for a towed vehicle, and more specifically to an alarm system for producing a warning signal when a vehicle is improperly prepared for towing.

2. Description of the Prior Art

Generally speaking, there is presently no effective and reliable means for informing a driver that his vehicle is being improperly towed, such as might occur when the ignition switch is in the locked steering position or when the vehicle has accidently been left in gear. Under these circumstances, a vehicle can suffer substantial damage in a very short period of time.

Therefore it can be appreciated that there exists a need for some type of new and improved signaling system which would indicate to a driver that a vehicle is improperly prepared for towing, and in this respect, the present invention substantially fulfills this need.

SUMMARY OF THE INVENTION

In view of the foregoing disadvantages inherent in the known types of signaling systems now present in the prior art, the present invention provides an improved transmission and steering signaling means which will operate to prevent the improper towing of a vehicle. As such, the general purpose of the present invention, which will be described subsequently in greater detail, is to provide a new and improved vehicle towing signaling system which has all the advantages of the prior art vehicle towing systems and none of the disadvantages.

To attain this, the present invention relies upon a signal light and an audible buzzer which can be conveniently mounted to the dash board of a towing vehicle. They will alert the driver as soon as he turns on the key if the towed vehicle has been left with a locked steering gear. It will also alert the driver as soon as the vehicle starts moving if the transmission in the towed vehicle has been left in gear.

It is necessary to utilize three components in the towed vehicle, i.e., a twelve volt relay, an oil pressure switch, and a switch indicating that the steering gear is unlocked. This latter switch may be either part of the vehicle's existing ignition switch or an added single post double throw (with center OFF) or double post double throw (with center OFF) switch. Both vehicle battery systems are used with a single wire connection in conjunction with the normal wiring connection for a towed vehicle's brake and tail lights. When the ignition switch is improperly left in the steering locked position, the control relay is closed thus activating the signalling devices. Similarly, a second control switch comprises a fluid pressure activated, spring biased, normally closed contact switch which is in fluid communication with an oil transfer conduit directed from the towed vehicle's engine oil pump. If the towed vehicle's transmission is mistakenly left in gear, the oil pump will generate a fluid pressure which will then operate to open the second control switch so as to activate the signalling devices.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out it various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved alarm system for a towed vehicle which has all the advantages of the prior art alarm systems and none of the disadvantages.

It is another object of the present invention to provide a new and improved alarm system for a towed vehicle which may be easily and efficiently manufactured and marketed.

It is a further object of the present invention to provide a new and improved alarm system for a towed vehicle which is of a durable and reliable construction.

An even further object of the present invention is to provide a new and improved alarm system for a towed vehicle which is susceptible of a low cost of manufacture with regard to both materials and labor, and which accordingly is then susceptible of low prices of sale to the consuming public, thereby making such alarm system economically available to the buying public.

Still yet another object of the present invention is to provide a new and improved alarm system for a towed vehicle which provides in the apparatuses and methods of the prior art some of the advantages thereof, while simultaneously overcoming some of the disadvantages normally associated therewith.

Still another object of the present invention is to provide a new and improved alarm system for a towed vehicle which operates to detect both ignition switch position and engine oil pressure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an electrical diagram illustrating the manner of operation of the buzzer and light installed in a towing vehicle.

FIG. 2 is an electrical diagram illustrating the manner of operation of a warning device in a towed vehicle having an ignition switch of the type normally used in American manufactured vehicles.

FIG. 3 is an electrical diagram illustrating the manner of operation of a warning device in a towed vehicle having an ignition switch of the type normally used in foreign manufactured vehicles (the difference is that the steering wheel is unlocked when the ignition is placed in the accessory position).

FIG. 4 is an illustration of a twelve volt relay in a normally closed position.

FIG. 5 is a cross-section view of an oil pressure switch which is normally closed.

DESCRIPTION OF THE PREFERRED EMBODIMENTS

With reference now to the drawings, and in particular to FIGS. 1-5 thereof, a new and improved towing alarm system embodying the principles and concepts of the present invention will be described.

In effect, the present invention comprises a device for towing a vehicle on all of its four wheels wherein such vehicle has a standard transmission. A warning light and buzzer, as will be subsequently described in greater detail, are installed on the dash of the towing vehicle. The alarm is armed for warning a soon as the towing vehicle's ignition is turned on provided that a towed vehicle is concurrently attached, and the alarm will operate if it is not properly hooked up for the intended towing.

The controls for the warning device are installed in the towed vehicle and will sound the alarm if the towed vehicle is not properly prepared for towing. These controls consist of a twelve volt relay which is normally closed, an oil pressure switch which is normally closed, and the manual closing of a S.P.D.T. switch which is in parallel with the ignition switch of the vehicle. The S.P.D.T. switch is a toggle switch more properly described as a single post double throw switch wherein the center position of the switch is OFF. On some American cars, a D.P.D.T. toggle switch is required. A D.P.D.T. switch is a toggle switch more properly defined as a double post double throw switch with the center position being OFF. The present invention alarm device is powered by the batteries of both the towing vehicle and the towed vehicle.

With reference to FIG. 1 of the drawings, the basic components of the present invention will be described. In this respect, a towing vehicle is generally designated by the reference numeral 1 with the dashboard of the towing vehicle being designated by the reference numeral 1a. A fuse panel or box 2 associated with the towing vehicle 1 is energized when the vehicle's ignition is turned on. A double electrical connector 3 is used to connect an electric power feed wire 20 from the fuse 2 to a warning light 4. The fuse panel wire 20 is located on the ignition side of the fuse panel with a branch of the wire 20a going from the double connector 3 to a warning buzzer 5, thus creating a short circuit to both the light 4 and the buzzer. A further electrical lead wire 7 runs from the light 4 to a second double connector 6 with another lead wire 7a being directed from the buzzer to this latter double connector. From the double connector 6, the wires 7, 7a become a single wire 7b which is directed to the rear of the towing vehicle so that it can be connected to the towed vehicle by means of a single connector 8.

FIG. 2 of the drawings generally illustrates the towed vehicle 9 with the dash assembly of the towed vehicle being generally by the reference numeral 9a. The towed vehicle 9 has a common American-made vehicle switch 18. Wire 7b, which is connected from connector 8 shown in FIG. 1 is connected to a contact associated with a twelve volt relay 13. An electric wire 10 leaves the relay 13 contacts and is connected to the vehicle ground. A further wire 11 is connected to the magnetic coil windings of relay 13 through a one amp in-line fuse 14 and also an S.P.D.T. center-OFF toggle switch 15. Wire 16 runs to the ignition wire of the ignition switch 18, and this wire 16 represents a manufacturer's wire which is installed at the time of assembly of the vehicle 9. From switch 15, the ignition wire 17 is connected to the ignition components of the towed vehicle 9, and wire 12 from the relay 13 magnetic coil wire winding is connected to the oil pressure switch 19 which is normally closed to the towed vehicle's ground.

FIG. 3 illustrates the wiring for a foreign made vehicle's ignition switch 18, wherein the reference numeral 9 again represents the towed vehicle and the reference numeral 9a represents the towed vehicle's dash assembly. Again, wire 7b comes from the towing vehicle's connector 8 as shown in FIG. 1 and is directed to the contacts in relay 13. Wire 10 is directed from the relay 13 contacts to the towed vehicle 9 ground, and wire 11 is connected to the relay, wire and then through a one amp in-line fuse 14 to the accessory side of a fuse panel or box 15a. Wire 16a is a vehicle manufacture's wire installed at the time of assembly of the vehicle, and wire 12 directed from the relay 13 magnetic coil windings is connected to the oil pressure switch 19 which is normally closed to the towed vehicle's 9 ground.

FIG. 4 is a schematic of a 12 volt relay 13 as utilized in the combination of the present invention wherein wire 7b is directed to the towing vehicle as previously described and wire 10 goes to ground. As aforedescribed, the hot wire 11 is directed from the in line fuse 14 and the ground wire 12 is directed to the oil pressure switch. The relay magnetic core 22 is positioned within the relay coil wire windings 23, and a contact closing spring (pull type) 24 is utilized to control the relay contacts 25 which are normally closed.

FIG. 5 is a schematic representation of the oil pressure switch 19 which is designed to open the contacts 25 with seven pounds per square inch oil pressure. As shown, the wire 12 is directed from the twelve volt relay 13 and a connector 27 is attached to the wire. A further connector 27a is attached to the spring seat for spring 28, wherein spring 28 comprises a connecting spring of the compression type. A bakelite electrical insulating material dome 26 covers the connecting spring and a pressure diaphragm 29. A contact disk 30 is connected to the diaphragm 29 to the spring 28, while the entire assembly is encapsulated within a steel housing 31. Electrical contacts 32 are built into the steel housing 31 and are normally closed, and a pipe thread base 33 also forms a part of the oil pressure switch 19. Oil pressure 34 is created in the housing so as to raise the diaphragm 29, thereby opening the contacts 32 when seven pounds per square inch of oil pressure is detected. A base ground 35 directed to the engine block per se or to a pipe tee installed in the engine block completes the electrical circuitry required to operate the invention.

With respect to the operation of the present invention, it can be appreciated that the power source for the light and buzzer alarm system is the towing vehicle's battery. When the ignition of the towing vehicle is turned on, power flows from the ignition switch to the vehicle fuse box. The light and buzzer are wired into the fuse box in parallel to each other from the fuse box ignition side. The grounding of the light and buzzer is in the towed vehicle through the aforedescribed 12 volt relay which makes the light and buzzer operate when the towed vehicle is attached to the towing vehicle. When towing and towed vehicles are connected for towing, the battery ground of both vehicle becomes a common ground, thereby allowing the light and buzzer in the towing vehicle to sound an alarm if the towed vehicle is not properly hooked and prepared for towing.

The main part of the alarm system is the 12 volt relay. The relay consists of a set of contacts which are opened by magnetic forces caused by electric current flowing through a coil of wire to ground. When current flows through the magnetic coil wire, the contacts inside the relay are opened. When current is not flowing through the magnetic coil wire, the contacts remain closed. The ground wire from the warning light in the buzzer are attached to the relay contacts and through the contacts to a convenient ground in the towed vehicle. The relay contacts normally closed now sound an alarm in the towing vehicle caused by the common ground between the two vehicles; however, by making relay contacts open with a flow of current through a magnetic coil, the alarm will not sound in the towing vehicle. To do this, the towed vehicle must be properly prepared for towing. This is accomplished by turning on the ignition switch in the towed vehicle in order to unlock the steering wheel of the towed vehicle and supply current to the magnetic coil, and by placing the towed vehicles standard transmission in a neutral position. It should be recognized that ignition switches on various cars are not standard or alike. Therefore, a system must be employed to cause current to flow through the magnetic wire coil in a 12 volt relay. On foreign vehicles, the accessory position on the ignition switch will unlock steering controls and at the same time allow current to flow to the vehicle accessories but not to the vehicle's ignition, thereby giving a current source at the vehicle's fuse box or panel on the accessory side. By connecting a wire from the fuse box accessory side to the 12 volt relay, a current is then applied to the magnetic coil when the steering controls are unlocked. On American built vehicles, the steering control cannot be unlocked unless the ignition switch is in the ignition or run position. If the towed vehicle's ignition system is left on, there will be current draw that will discharge the vehicle's battery and cause damage to the ignition components. To eliminate this problem, a S.P.D.T. toggle switch is placed between the vehicle's ignition switch and the ignition components. This could be mounted in various places on the towed vehicle, and this would stop damage to ignition components and also give a source of current to operate the 12 volt relay with steering controls unlocked. To operate the 12 volt relay, the toggle switch must be switched to a relay position. When the toggle switch is in the relay position, the towed vehicle will not start due to the disconnected ignition components.

On certain later model vehicles, there are computer read out panels which are energized as well as ignition components when the ignition is turned on. On this type of system, a D.P.D.T. toggle switch is required because two ignition wires will have to be routed through the toggle switch in order to disconnect ignition components and the computer readout panel so as to eliminate battery draw or damage to the computer components.

Once the current is being supplied to the 12 volt relay magnetic coil wire by one of the three methods above described, the current must flow through the magnetic coil to ground to complete the circuit. This is accomplished by adding the diaphragm oil pressure switch which is normally closed to ground, thereby causing the current to flow through the relay's magnetic coil which opens the relay contacts so as to disarm the warning light and buzzer in the towing vehicle.

If the towed vehicle is moved while the standard transmission is in gear, engine oil pressure in the towed vehicle will cause the oil pressure switch contact to open. The open contacts cease magnetic current flow thus allowing the inside relay contacts to close and the alarm light to glow and the buzzer to sound inside the towing vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A signalling system for facilitating a proper towing of a four-wheeled vehicle having a standard transmission, said system including a warning means installed in the dash of a towing vehicle, said warning means including at least one of a warning light and buzzer, said at least one of said warning light and said buzzer being activated if a towed vehicle is not properly hooked for towing, and said proper towing of a towed vehicle occurs when said towed vehicle's steering wheel is unlocked and also when said towed vehicle's standard transmission is in a neutral position, and said warning means is activated by a power source, said power source being said towing vehicle's battery, and a main component of said warning means comprises a 12 volt relay, said 12 volt relay receiving electric current from said power source when said towed vehicle's ignition switch is turned on.

2. A signalling system for facilitating a proper towing of a four wheeled vehicle having a standard transmission as described in claim 1, wherein said towing and towed vehicles are connected to a common electrical ground, thereby permitting said at least one of said warning light and said buzzer in said towing vehicle to sound an alarm if said towed vehicle is not properly prepared for towing.

* * * * *